US008855340B2

(12) United States Patent
Yoo et al.

(10) Patent No.: US 8,855,340 B2
(45) Date of Patent: Oct. 7, 2014

(54) APPARATUS FOR REPRODUCTING WAVE FIELD USING LOUDSPEAKER ARRAY AND THE METHOD THEREOF

(75) Inventors: Jae-Hyoun Yoo, Daejeon (KR); Hwan Shim, Seoul (KR); Hyunjoo Chung, Seoul (KR); Jeongil Seo, Daejeon (KR); Kyeongok Kang, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 611 days.

(21) Appl. No.: 12/883,734

(22) Filed: Sep. 16, 2010

(65) Prior Publication Data

US 2012/0070021 A1 Mar. 22, 2012

(30) Foreign Application Priority Data

Dec. 9, 2009 (KR) ........................ 10-2009-0122015

(51) Int. Cl.
*H04R 5/02* (2006.01)
*G06F 17/00* (2006.01)
*H04S 3/00* (2006.01)

(52) U.S. Cl.
CPC ...................................... *H04S 3/002* (2013.01)
USPC ............................................ 381/300; 700/94

(58) Field of Classification Search
CPC .................................. H04S 3/002; H04R 5/02
USPC ........... 381/1, 17–19, 86, 302, 310, 300, 161; 700/94
See application file for complete search history.

(56) References Cited

U.S. PATENT DOCUMENTS

| | | | | |
|---|---|---|---|---|
| 8,170,246 | B2 * | 5/2012 | Yoo et al. | 381/310 |
| 2004/0247134 | A1 * | 12/2004 | Miller, III | 381/19 |
| 2009/0136048 | A1 * | 5/2009 | Yoo et al. | 381/27 |
| 2009/0290724 | A1 * | 11/2009 | Corynen et al. | 381/99 |
| 2010/0111336 | A1 * | 5/2010 | Jeong et al. | 381/306 |
| 2011/0069850 | A1 * | 3/2011 | Harma | 381/307 |
| 2011/0135100 | A1 * | 6/2011 | Zhan | 381/17 |

FOREIGN PATENT DOCUMENTS

| | | |
|---|---|---|
| JP | 11-27604 | 1/1999 |
| JP | 2003-164000 | 6/2003 |
| JP | 2005-130169 | 5/2005 |
| JP | 2006-340330 | 12/2006 |
| JP | 2006-352570 | 12/2006 |
| JP | 2007-266967 | 10/2007 |
| JP | 2007-274061 | 10/2007 |
| JP | 2008-227803 | 9/2008 |
| KR | 10-2004-0094599 | 11/2004 |
| KR | 10-2009-0054802 | 6/2009 |
| WO | 2009/101778 | 8/2009 |

* cited by examiner

*Primary Examiner* — Fan Tsang
*Assistant Examiner* — Eugene Zhao
(74) *Attorney, Agent, or Firm* — Staas & Halsey LLP

(57) ABSTRACT

Provided is an apparatus and method for reproducing a wave field using a loudspeaker array. A loudspeaker array may be configured in front of and behind a listener, and a wave field synthesis rendering and a three-dimensional sound image localization rendering may be performed based on a position of a sound source.

17 Claims, 8 Drawing Sheets

APPARATUS FOR REPRODUCTING WAVE FIELD USING LOUDSPEAKER ARRAY AND THE METHOD THEREOF

CROSS-REFERENCE TO RELATED APPLICATION

This application claims the priority benefit of Korean Patent Application No. 10-2009-0122015, filed on Dec. 9, 2009, in the Korean Intellectual Property Office, the disclosure of which is incorporated herein by reference.

BACKGROUND

1. Field

One or more embodiments relate to an apparatus and method for reproducing a wave field using a loudspeaker array, and more particularly, to an apparatus and method that may reproduce a wave field by appropriately configuring a loudspeaker array.

2. Description of the Related Art

In general, a scheme of reproducing a discrete multi-channel audio signal may have a narrow optimal listening area. Recently, to expand the optimal listening area, a Wave Field Synthesis (WFS) reproduction scheme has been studied. As an example, the discrete multi-channel audio signal may use a two channel stereo scheme, a 5.1 channel stereo scheme, a 7.1 channel stereo scheme, and the like.

The WFS reproduction scheme may require a large number of loudspeakers. When the number of loudspeakers increases, it is difficult to install a system adopting the WFS reproduction scheme in a house having limited space.

More specifically, in a case of the system adopting the WFS reproduction scheme, a speaker array may be configured in a square type or a circle type with respect to 360° around a listener. Also, the speaker array may be configured in a front side, a left side, and a right side of the listener, that is, in a 'ㄷ' shape.

In this manner, the speaker array may be configured in a manner that surrounds the listener and thus, a wave field reproduction performance may be improved, however, it is difficult to configure, in a relatively narrow space such as a house, the speaker array in the manner that surrounds the listener.

Moreover, along with a commercialization of digital television (DTV) in houses, display manufacturing technologies have been rapidly developed. Accordingly, a size of the display may increase, and a stereophonic wave field reproduction performance may need to be provided that is suitable for the increased size of the display.

Thus, there is a demand for a wave field reproduction scheme where the stereophonic wave field reproduction performance may be provided that is suitable for a large sized display in a limited space such as a house.

SUMMARY

An aspect of the present invention provides an apparatus and method for reproducing a wave field in which a loudspeaker array is arranged in front of a listener and behind the listener, so that the apparatus may be easily installed in a house.

Another aspect of the present invention provides an apparatus for reproducing a wave field in which a loudspeaker array is arranged in two rows in front of a listener, and a three-dimensional (3D) wave field localization rendering may be performed, thereby reproducing a sound source being elevated.

According to an aspect of one or more embodiments, there may be provided an apparatus for reproducing a wave field, including: a sound source position analysis unit to determine a position of a sound source by analyzing sound image localization information; a rendering unit to output a wave field synthesis signal by performing a wave field synthesis rendering for the sound source based on the determined position of the sound source; and a plurality of loudspeakers to reproduce the wave field synthesis signal and to be arranged in two front rows.

The apparatus may further include a plurality of loudspeakers to reproduce the wave field synthesis signal and to be arranged in one back row.

The plurality of loudspeakers may be respectively arranged, in one row, on an upper portion and a lower portion of a display positioned in front of a listener.

The plurality of loudspeakers arranged in the two rows in front of the listener may have directivity directed to ears of the listener.

The sound source position analysis unit may determine whether the sound source is one of a sound source positioned in front of the listener, a sound source positioned in front of the listener and being elevated, a sound source positioned behind the listener and being elevated, and a sound source positioned in a listening area between loudspeakers arranged in front of the listener and loudspeakers arranged behind the listener, by analyzing the sound image localization information.

According to another aspect of one or more embodiments, there may be provided an apparatus for reproducing a wave field, including: a sound source position analysis unit to determine a position of a sound source by analyzing sound image localization information; a rendering unit to output a wave field synthesis signal by performing a wave field synthesis rendering for the sound source based on the determined position of the sound source; a plurality of loudspeakers to reproduce the wave field synthesis signal and to be arranged in two front rows; and a plurality of loudspeakers to reproduce the sound source where the rendering is performed and to be arranged behind.

According to another aspect of one or more embodiments, there may be provided a method for reproducing a wave field, including: determining a position of a sound source by analyzing sound image localization information; generating a wave field synthesis signal by performing a wave field synthesis rendering for the sound source based on the determined position of the sound source; and reproducing the wave field synthesis signal by a plurality of loudspeakers arranged in the two rows in front of a listener and a plurality of loudspeakers arranged in one row behind the listener.

Additional aspects of embodiments will be set forth in part in the description which follows and, in part, will be apparent from the description, or may be learned by practice of the disclosure.

EFFECT

According to an embodiment, there is provided an apparatus for reproducing a wave field in which a loudspeaker array is arranged in front of a listener and behind the listener, so that the apparatus may be easily installed in a house.

Also, according to an embodiment, there is provided an apparatus for reproducing a wave field in which a loudspeaker array is arranged in two rows in front of a listener, and a three-dimensional (3D) wave field localization rendering may be performed, thereby reproducing a sound source being elevated.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
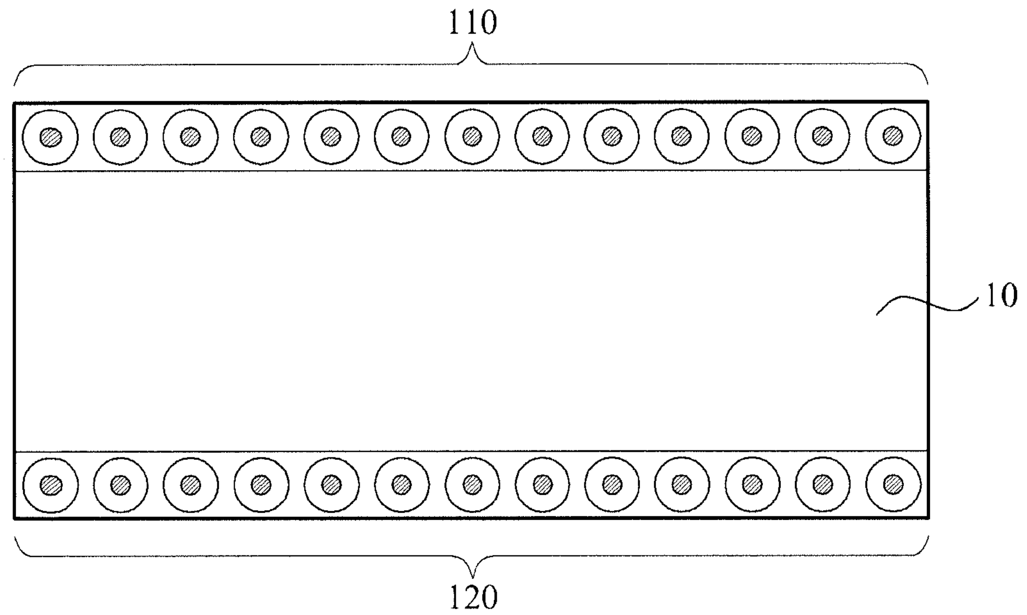
FIG. 1 illustrates a loudspeaker array arranged in two front rows according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a loudspeaker array arranged in two front rows according to an embodiment. In FIG. 1, for convenience of description, a display where a plurality of loudspeakers is arranged may be provided as an example of electronic equipment. Accordingly, the plurality of loudspeakers may be arranged in electronic equipment other than the display positioned in a front side of a listener.

Referring to FIG. 1, a plurality of loudspeakers 110 and 120 may be arranged in an upper portion or a lower portion of a display 10. In this instance, the display 10 may be positioned in a front side of a listener. As the display, a digital television (DTV) or a television may be used.

More specifically, a sound image having a vertical movement on the display 10 may be reproduced through the plurality of loudspeakers 110 arranged in the upper portion of the display 10 and the plurality of loudspeakers 120 arranged in the lower portion of the display 10.

Figure 2:
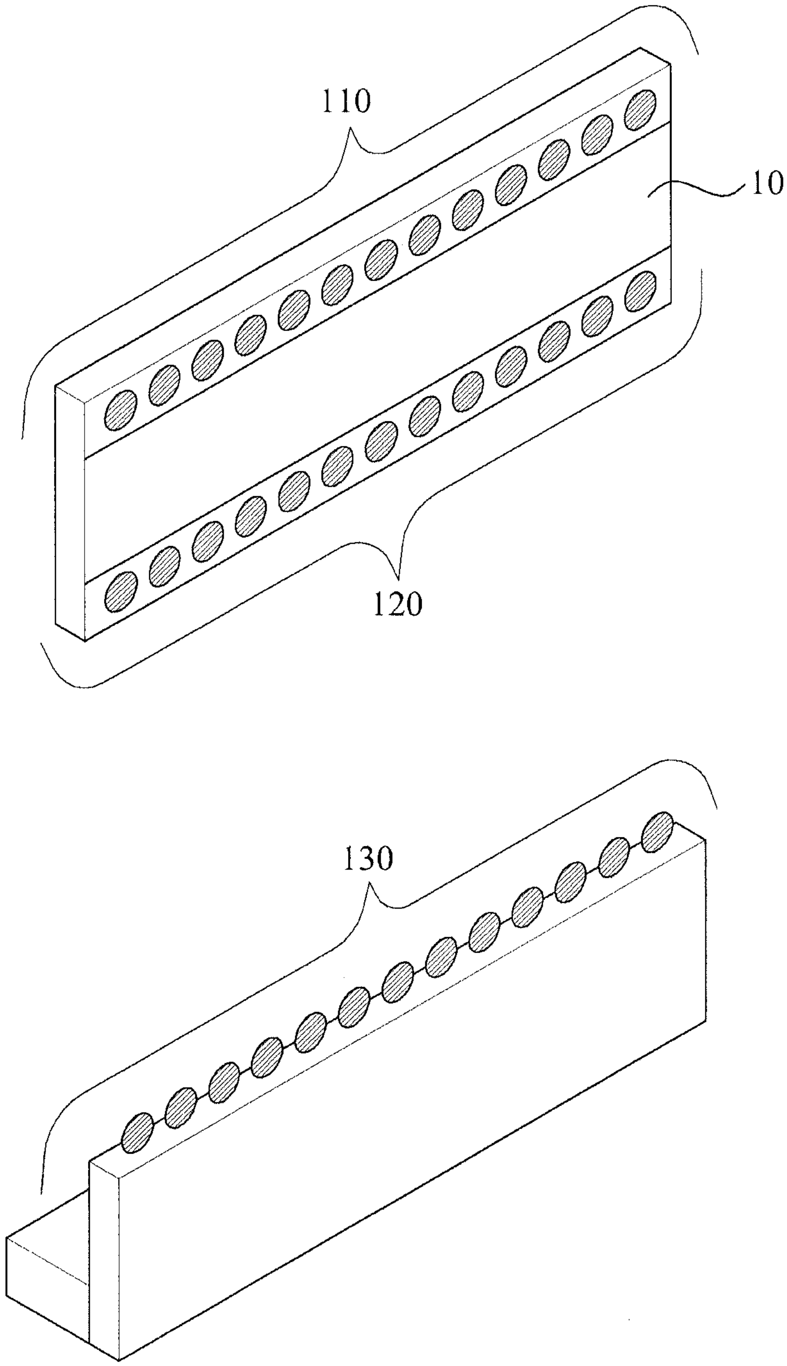
FIG. 2 illustrates a loudspeaker array arranged in two front rows and in one back row according to an embodiment.

Also, the sound image may be formed on a listening space, or a reproduction performance of a Wave Field Synthesis (hereinafter, referred to as 'WFS') signal may be improved. In this instance, as illustrated in FIG. 2, a rear loudspeaker array may be configured using a structure positioned behind the listener. As the structure positioned behind the listener, a rear wall, a piece of furniture such as a sofa, an electronic equipment, and the like which are positioned behind the listener may be used.

Figure 3:
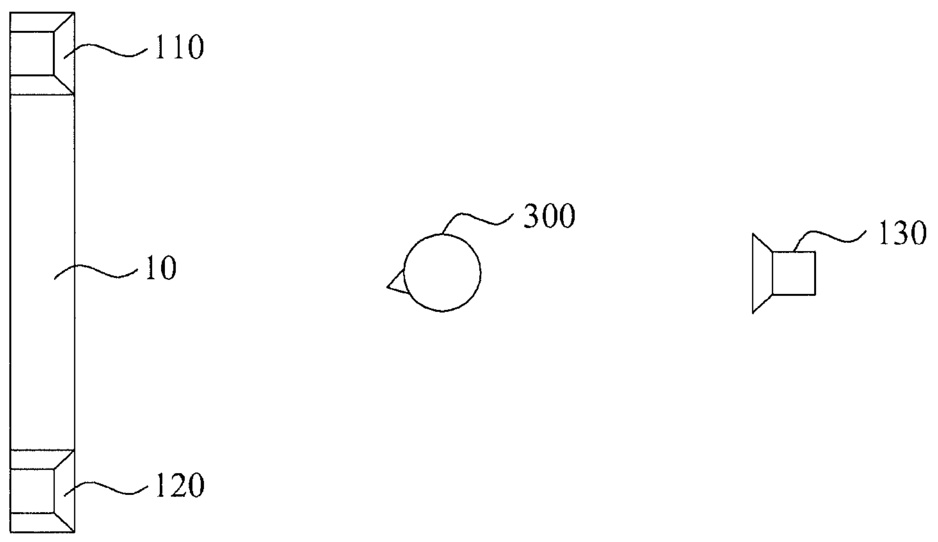
FIG. 3 is a side view illustrating a loudspeaker array configured in three rows according to an embodiment.

Accordingly, as illustrated in FIGS. 2 and 3, an apparatus for reproducing a multi-channel audio signal may reproduce a more stereoscopic wave field using a three row-loudspeaker array. Here, the three row-loudspeaker array may include the plurality of loudspeakers 110 and 120 arranged in two front rows and a plurality of loudspeakers 130 arranged in one back row.

When the plurality of loudspeakers is respectively arranged in front of and behind a listener 300, in one row, the apparatus may adjust a height of each of the plurality of loudspeakers arranged in front of and behind the listener 300 to be the same as a height of ears of the listener 300.

In this instance, as illustrated in FIG. 3, when the plurality of loudspeakers is arranged in two front rows and in one back row, the height of each of the plurality of loudspeakers 110 and 120 arranged in two front rows may need to be the same as the height of ears of the listener 300. Specifically, a center of the display 10 may be disposed in front of the listener 300 to have the same height as an eye height of the listener 300. Thus, when the plurality of loudspeakers is arranged, in two front rows, on the upper portion and the lower portion of the display 10, an opposing reciprocal relation between characteristics where the two front loudspeakers are arranged with respect to the height of ears of the listener 300 to improve a wave field reproduction performance may occur. Accordingly, a performance of the wave field reproduced using the two front row-loudspeakers may be improved.

Hereinafter, a scheme of improving a wave field reproduced using the two front row-loudspeakers 110 and 120 when the display 10 is disposed in front of the listener 300 with respect to an eye height of the listener 300 will be described with reference to FIG. 4.

Figure 4:
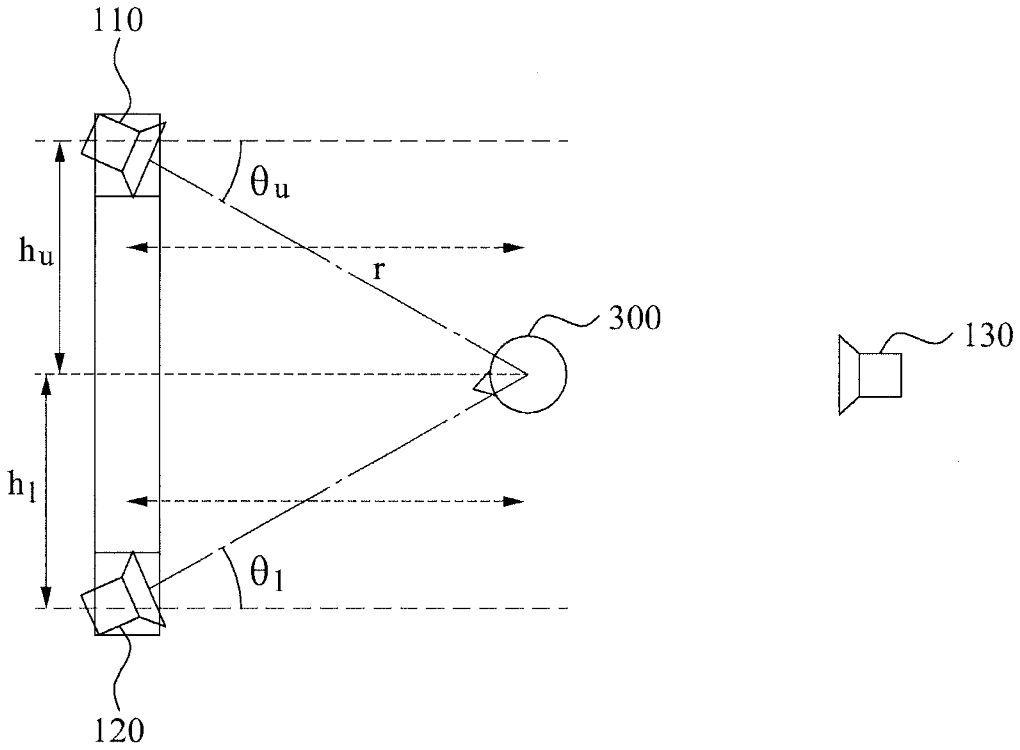
FIG. 4 is a diagram used for describing directivity of a front loudspeaker.

Referring to FIG. 4, the plurality of loudspeakers 110 and 120 arranged in two front rows may have directivity directed to ears of the listener 300. In this instance, an apparatus for reproducing a wave field according to an embodiment may calculate a directional angle of each of the plurality of loudspeakers 110 and 120, and provide the calculated directional angle so that the plurality of loudspeakers has directivity.

More specifically, the apparatus may calculate a directional angle corresponding to each of the plurality of loudspeakers 110 arranged in the upper portion of the display 10 and a directional angle corresponding to each of the plurality of loudspeakers 120 arranged in the lower portion of the display 10, with respect to speaker heights $h_l$ and $h_u$ based on a distance (r) from the display 10 to the listener and the listener. Here, referring to FIG. 4, the speaker heights $h_l$ and $h_u$ may be a distance from a position of the loudspeakers 110 and 120 arranged on the display 10 to a position, on the display 10, corresponding to ears of the listener 300.

For example, when the plurality of loudspeakers 110 is arranged in the upper position of the display 10, the speaker height $h_u$ may be a distance from a position of the upper loudspeaker to the position corresponding to the ears of the listener.

Also, when the plurality of loudspeakers 120 is arranged in the lower position of the display 10, the speaker height $h_l$ may be a distance from a position of the lower loudspeaker to the position corresponding to the ears of the listener.

More specifically, the apparatus may obtain the directional angle of each of the plurality of loudspeakers 110 arranged in the upper portion of the display by calculating an arc tangent ($\tan^{-1}(h_u/r)$) for the distance (r) from the display to the listener and the speaker height $h_u$. Thereafter, an angle of each of the plurality of loudspeakers 110 arranged in the upper portion of the display may be manually or automatically adjusted to be the same as the obtained directional angle.

Also, the apparatus may obtain the directional angle of each of the plurality of loudspeakers 120 arranged in the lower portion of the display by calculating an arc tangent ($\tan^{-1}(h_l/r)$) for the distance (r) from the display 10 to the listener and the speaker height $h_l$. Thereafter, an angle of each of the plurality of loudspeakers 120 arranged in the lower portion of the display may be manually or automatically adjusted to be the same as the obtained directional angle.

In this instance, the distance (r) and the speaker heights $h_l$ and $h_u$ may be predetermined, or may be inputted by a user using an input device (not illustrated). Here, the input device may be mounted on the apparatus in a key button type or a touch pad type, or may be a remote controller.

The apparatus may have speaker configuration information such as a number of the plurality of loudspeakers arranged in front lower/upper portions of the display, a length of a loudspeaker array, a distance between the front loudspeaker array and the rear loudspeaker array, an arrangement state of the plurality of loudspeakers, and a size of electronic equipment where the plurality of loudspeakers is disposed.

The above described speaker configuration information may be inputted through an input device (not illustrated) mounted on the apparatus or through manipulation by a user using a remote controller, or may be inputted from an outside through a microphone. In this instance, in a case of using the microphone, the distance (r) from the display to the listener and the speaker heights $h_l$ and $h_u$ may be obtained. Here, the microphone may be installed in a position corresponding to a height of ears of the listener.

More specifically, the plurality of loudspeakers 110, 120, and 130 may be installed around the listener 300 or the display 10 in such as manner as to be changeable based on the speaker configuration information.

Figure 5:
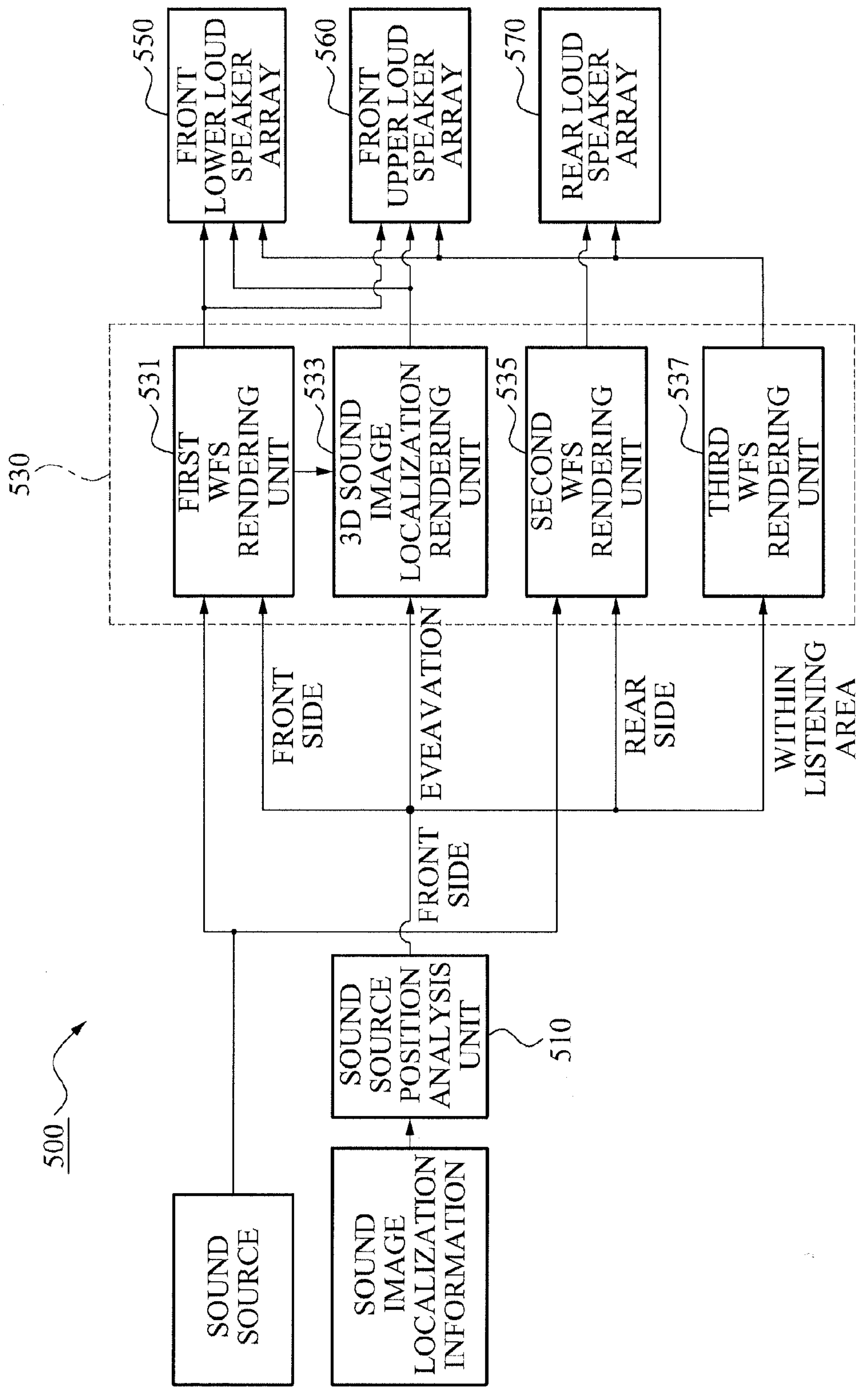
FIG. 5 illustrates a configuration of an apparatus for reproducing a wave field according to an embodiment.

For example, when a size of the display is changed, a number of the plurality of loudspeakers may increase or decrease FIG. 5 illustrates a configuration of an apparatus 500 for reproducing a wave field according to an embodiment.

Referring to FIG. 5, the apparatus 500 includes a sound source position analysis unit 510, a rendering unit 530, a front lower loudspeaker array 550, a front upper loudspeaker array 560, and a rear loudspeaker array 570.

Here, the front lower loudspeaker array 550 may include a plurality of loudspeakers 120 arranged in the lower portion of the display 10 in one row. Similarly, the front upper loudspeaker array 560 may include a plurality of loudspeakers 110 arranged in the upper portion of the display 10 in one row.

The sound source position analysis unit 510 may determine a position of a sound source by analyzing sound image localization information inputted from an outside. Here, the sound image localization information may correspond to the position of the sound source on a space where the listener is located, in a case of based on the listener.

For example, the sound source position analysis unit 510 may determine whether the sound source is one of a sound source positioned in front of the listener, a sound source positioned in front of the listener and being elevated, a sound source positioned behind the listener and being elevated, and a sound source positioned in a listening area between the plurality of loudspeakers arranged in front of the listener and the plurality of loudspeakers arranged behind the listener, by analyzing the sound image localization information.

The rendering unit 530 may perform a wave field synthesis rendering for the sound source based on the position of the sound source determined by analyzing the sound image localization information. In this instance, the rendering unit 530 may include a first WFS rendering unit 531, a three-dimensional (3D) sound image localization rendering unit 533, a second WFS rendering unit 535, and a third WFS rendering unit 537.

When the sound source is determined, in the sound source position analysis unit 510, as the sound source positioned in front of the listener or the sound source positioned in front of the listener and being elevated, the first WFS rendering unit 531 may perform a wave field synthesis rendering on the inputted sound source to generate a wave field synthesis signal. Accordingly, the generated wave field synthesis signal may be reproduced using the front lower loudspeaker array 550 and the front upper loudspeaker array 560.

In this instance, when the sound source is determined, in the sound source position analysis unit 510, as the sound source positioned behind the listener and being elevated, the first WFS rendering unit 531 may output the generated sound image synthesis signal to the 3D sound image localization rendering unit 533.

Accordingly, the 3D sound image localization rendering unit 533 may perform a 3D sound image localization rendering on the wave field synthesis signal to generate a 3D sound image localization signal. In this instance, the generated 3D sound image localization signal may be reproduced using the front lower loudspeaker array 550 and the front upper speaker array 560.

For example, the 3D sound image localization rendering unit 533 may generate the 3D sound image localization signal by applying, to the generated wave field synthesis signal, a 3D sound image localization rendering scheme such as power panning, vector based amplitude panning (VBAP), head related transfer function (HRTF), and the like.

More specifically, when the power panning is applied, the 3D sound image localization rendering unit 533 may perform a sound image localization rendering on the wave field synthesis signal, using a sound pressure difference between the front upper loudspeakers and the front lower loudspeakers. For example, the 3D sound image localization rendering unit 533 may generate the 3D sound image localization signal using the sound pressure difference between the upper loudspeakers and the lower loudspeakers.

Also, when the VBAP is applied, the 3D sound image localization rendering unit 533 may generate the 3D sound image localization information using a ratio of a sound pressure generated from either three upper or three lower loudspeakers being closest to the sound source of a corresponding position. Accordingly, a sound image having an appropriate sense of depth and the sound source being elevated may be applied to an image displayed on the display 10.

When the sound source is determined, in the sound source position analysis unit 510, as the sound source positioned behind the listener, the second WFS rendering unit 535 may perform the wave field synthesis rendering on the inputted sound source to generate a wave field synthesis signal.

Accordingly, the generated wave field synthesis signal may be reproduced using the rear loudspeaker array 570. Here, the rear loudspeaker array 570 may include the plurality of loudspeakers 130 arranged behind the listener in one row.

When, in the sound source position analysis unit 510, the sound source is determined as the sound source positioned in the listening area between the plurality of loudspeakers arranged in front of the listener and the plurality of loudspeakers arranged behind the listener, the third WFS rendering unit 537 may perform the wave field synthesis rendering for the sound source to generate a wave field synthesis signal. Accordingly, the generated wave field synthesis signal may be reproduced using the front lower and upper loudspeaker arrays 550 and 560 and the rear loudspeaker array 570.

In this instance, when installation heights of the front lower and upper loudspeaker arrays 550 and 560 and of the rear loudspeaker array 570 are different from each other, the third WFS rendering unit 537 may apply the HRTF to the generated wave field synthesis signal or the 3D sound image localization signal.

For example, when the HRTF is applied, the third WFS rendering unit 537 may increase a level of the wave field synthesis signal to be reproduced using the front lower loudspeaker array 550, by a height difference between the front lower loudspeaker array 550 and the rear loudspeaker array 570. Accordingly, the increasing wave field synthesis signal may be reproduced using the front lower loudspeaker array 550.

Similarly, the third WFS rendering unit 537 may decrease a level of the wave field synthesis signal to be reproduced using the front upper loudspeaker array 560, by a height difference between the front upper loudspeaker array 560 and the rear loudspeaker array 570. Accordingly, the decreasing wave field synthesis signal may be reproduced using the front upper loudspeaker array 560.

Also, the third WFS rendering unit 537 may reproduce generated wave field synthesis signals excluding the generated wave field synthesis signal where the HRTF is applied, using the front lower and upper loudspeaker arrays 550 and 560 in the same manner as the above.

Also, the third WFS rendering unit 537 may adjust a sound pressure ratio of the wave field synthesis signal to be reproduced using the front lower and upper loudspeaker arrays 550 and 560, based on a height of the rear loudspeaker array 570. Accordingly, the wave field synthesis signal where the sound pressure ratio is adjusted may be reproduced using the front lower and upper loudspeaker arrays 550 and 560.

Figure 6:
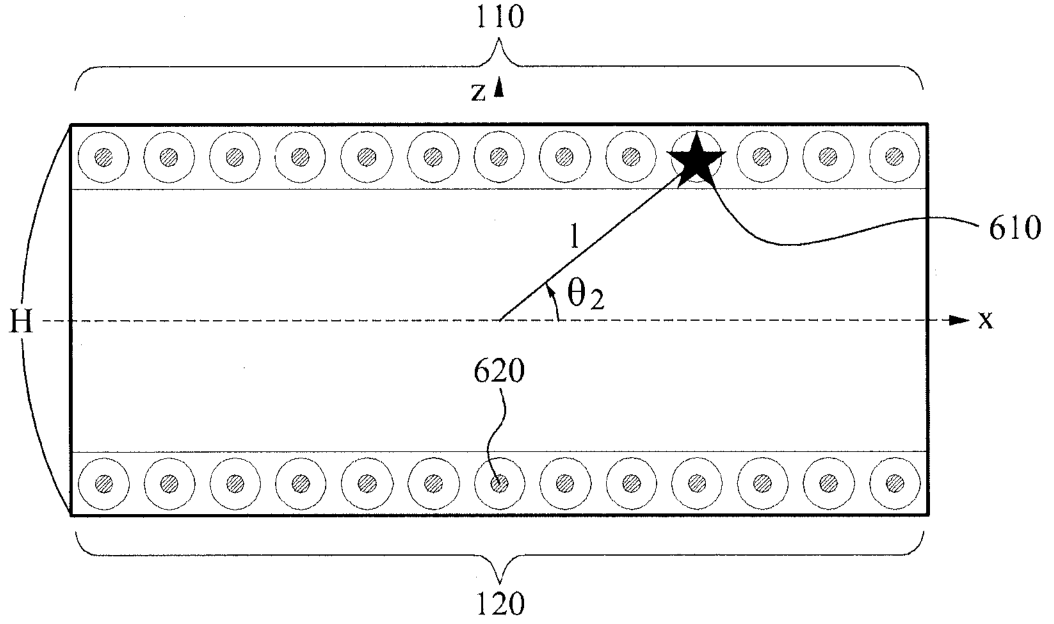
FIG. 6 is a diagram used for describing coordinate selection for front 3D sound image localization.

FIG. 6 is a diagram used for describing coordinate selection for front 3D sound image localization.

Referring to FIG. 6, sound image localization information H, l, and $\theta_2$ may include a size (H) of the display 10, a distance (l) from a center of the display 10 to a predetermined position 610 of a loudspeaker on the display 10, and an angle ($\theta_2$) from the center of the display 10. In this instance, the sound image localization information may be predetermined, or inputted from an outside.

The sound source position analysis unit 510 may calculate position coordinates (x, z) corresponding to the predetermined position 610 of the loudspeaker on the display 10, based on the sound image localization information.

For example, the sound source position analysis unit 510 may calculate, as ($x=l\times\cos(\theta_2)$, $z=l\times\sin(\theta_2)$), the position coordinates corresponding to the predetermined position 610, based on the predetermined sound image localization information and Pythagoras's theorem.

In this instance, when two loudspeakers 610 and 620 exist in a vertical direction with respect to the calculated position coordinates (x, z), the rendering unit 530 may localize a virtual sound source based on a sound pressure difference between the two loudspeakers 610 and 620. In this instance, the rendering unit 530 may localize the virtual sound source by adjusting a value of the distance (l) in accordance with the size (H) of the display.

Also, when the loudspeaker does not exist in the vertical direction with respect to the calculated position coordinates of the predetermined position 610, the rendering unit 530 may select two loudspeakers positioned close to the predetermined position 610, from among the plurality of loudspeakers 110 and 120. The rendering unit 530 may localize the virtual sound source by adjusting a sound pressure difference between the selected two loudspeakers.

Figure 7:
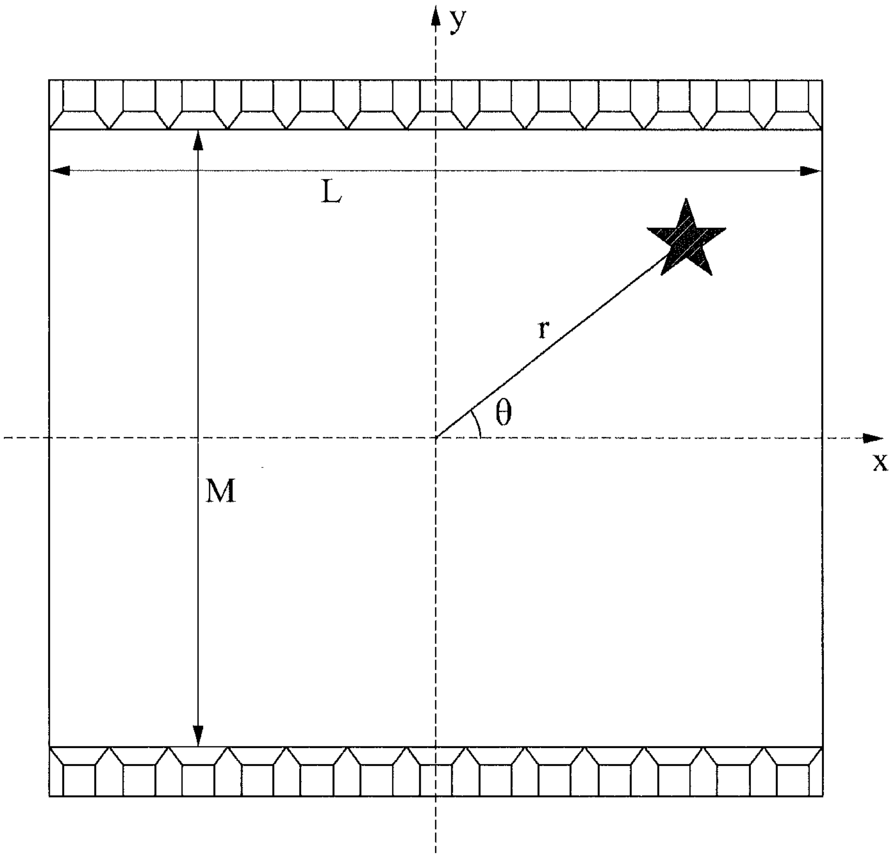
FIG. 7 is a diagram used for describing coordinate selection for front/rear sound image localization.

Also, the rendering unit 530 may perform a wave field synthesis rendering based on the predetermined sound image localization information r and θ, with respect to the listener, as illustrated in FIG. 7.

More specifically, the sound source position analysis unit 510 may determine whether the sound source is a sound source positioned in front of or behind the listener, based on the sound image localization information r and θ. Thereafter, the rendering unit 530 may perform the wave field synthesis rendering ($x=r\times\cos(\theta)+L/2$, $z=r\times\sin(\theta)+M/2$) for the sound source based on the determined position of the sound source. Accordingly, the signals rendered for each position may be reproduced using the front lower and upper loudspeaker arrays 550 and 560 and the rear loudspeaker array 570.

Figure 8:
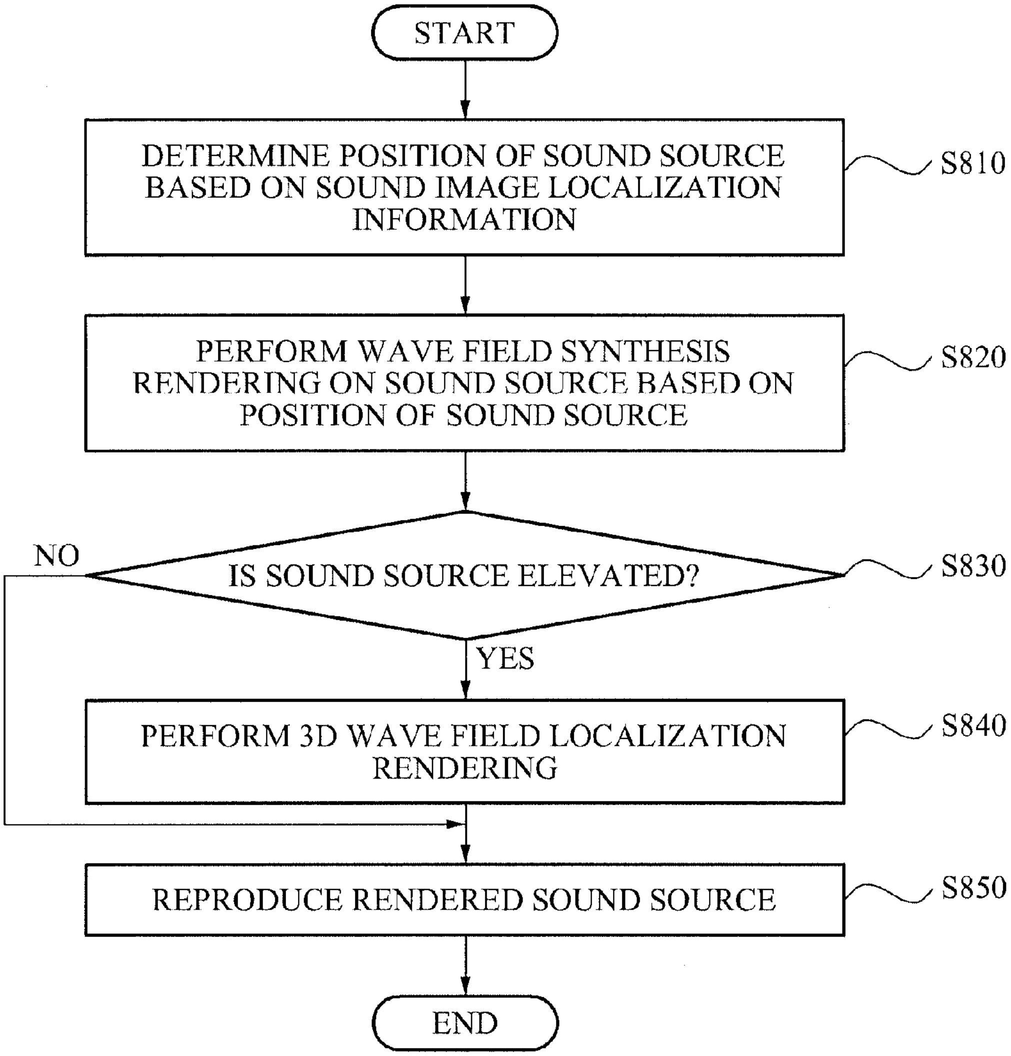
FIG. 8 is a flowchart illustrating operations of an apparatus for reproducing a wave field according to an embodiment.

FIG. 8 is a flowchart illustrating operations of an apparatus for reproducing a wave field according to an embodiment.

In operation S810, the sound source position analysis unit 510 may determine a position of a sound source based on sound image localization information. Here, the sound image localization information may be predetermined, or inputted from an outside.

In operation S820, the rendering unit 530 may perform a wave field synthesis rendering for the sound source based on the determined position of the sound source to generate a wave field synthesis signal.

More specifically, the rendering unit 530 may perform the wave field rendering for the sound source when the sound source is one of a sound source positioned in front of a listener, a sound source positioned in front of the listener and being elevated, a sound source positioned behind the listener, and a sound source positioned in a listening area between front and rear loudspeakers.

In this instance, when the sound source is the sound source positioned in front of the listener and being elevated ('YES' branch of operation S830), the rendering unit 530 may perform a 3D sound image localization rendering on the generated wave field synthesis signal in operation S840.

In operation S850, the rendered sound sources may be reproduced using the front lower and upper loudspeaker arrays 550 and 560 and the rear loudspeaker array 570.

More specifically, when the sound source is the sound source positioned in front of the listener, the wave field synthesis signal generated in operation S820 may be reproduced using the front lower and upper loudspeaker arrays 550 and 560.

Also, when the sound source is the sound source positioned behind the listener, the wave field synthesis signal generated in operation S820 may be reproduced using the rear loudspeaker array 570.

Also, when the sound source is the sound source positioned in front of the listener and being elevated, the 3D sound image localization signal generated in operation S840 may be reproduced using the front lower and upper loudspeaker arrays 550 and 560.

Also, when the sound source is the sound source positioned in the listening area, the wave field synthesis signal generated in operation 5820 may be reproduced using the front lower and upper loudspeaker arrays 550 and 560 and the rear loudspeaker array 570.

In this instance, the rendering unit 530 may apply the wave field synthesis signal to the HRTF to reproduce the wave field synthesis signal having the HRTF applied using the front lower and upper loudspeaker arrays 550 and 560 and the rear loudspeaker array 570.

Also, the wave field synthesis signal where a ratio of a sound pressure in a vertical direction is adjusted may be reproduced using the front lower and upper loudspeaker arrays 550 and 560 and the rear loudspeaker array 570.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus reproducing a wave field, comprising:

a sound source position analysis unit to determine a position of a sound source by analyzing sound image localization information;

a rendering unit to output a wave field synthesis signal by performing a wave field synthesis rendering for the sound source based on the determined position of the sound source;

a first plurality of loudspeakers to be arranged in at least one back row and to reproduce the wave field synthesis signal; and a second plurality of loudspeakers to be arranged in at least two front rows and to reproduce a wave field synthesis signal adjusted based on a sound pressure ratio between the at least two front rows of the second plurality of loudspeakers, selected as being arranged in a vertical direction, to localize a virtual sound source based on the sound pressure ratio, and wherein the at least two front rows of the second plurality of loudspeakers have directivity directed to a listener.

2. The apparatus of claim 1, wherein the second plurality of loudspeakers respectively arranged, in one row, on an upper portion and a lower portion of a display positioned in front of the listener.

3. The apparatus of claim 1, wherein a directional angle of each of the second plurality of loudspeakers having the directivity is determined based on a distance from a display positioned in front of the listener to the listener, and a height of the listener.

4. The apparatus of claim 1, wherein the sound source position analysis unit determines whether the sound source is one of a sound source positioned in front of the listener, a sound source positioned in front of the listener and being elevated, a sound source positioned behind the listener, and a sound source positioned in a listening area between loudspeakers arranged in front of the listener and loudspeakers arranged behind the listener, by analyzing the sound image localization information.

5. The apparatus of claim 4, wherein the rendering unit outputs the wave field synthesis signal by performing the wave field synthesis rendering for the sound source when the sound source is the sound source positioned in front of the listener, and the wave field synthesis signal is reproduced by the second plurality of loudspeakers.

6. The apparatus of claim 4, wherein the rendering unit further comprises:

a wave field synthesis rendering unit to output the wave field synthesis signal by performing the wave field rendering for the sound source when the sound source is the sound source positioned in front of the listener and being elevated; and a three-dimensional (3D) sound image localization rendering unit to output a 3D sound image localization signal by performing a 3D sound image localization rendering on the wave field synthesis signal.

7. The apparatus of claim 6, wherein the 3D sound image localization rendering unit outputs the 3D sound image localization signal by performing, on the wave field synthesis signal, one of a power panning, a vector based amplitude panning (VBAP), and a head related transfer function (HRTF).

8. The apparatus of claim 4, wherein the rendering unit outputs the wave field synthesis signal by performing the wave field synthesis rendering for the sound source when the sound source is the sound source positioned behind the listener, and the wave field synthesis signal is reproduced by the first plurality of loudspeakers.

9. The apparatus of claim 4, wherein the rendering unit outputs the wave field synthesis signal by performing the wave field synthesis rendering for the sound source when the sound source is the sound source positioned in the listening area between the second plurality of loudspeakers and the first plurality of loudspeakers, and the wave field synthesis signal is reproduced by the first plurality of loudspeakers arranged and the second plurality of loudspeakers.

10. The apparatus of claim 9, wherein an HRTF is performed on the wave field synthesis signal, so that a height of a loudspeaker array arranged in an upper portion or a lower portion of a display from among the second plurality of loudspeakers and a height of a rear loudspeaker array coincides with each other within a predetermined error range.

11. The apparatus of claim 9, wherein the wave field synthesis signal is uniformly reproduced by a loudspeaker array arranged in an upper portion or a lower portion of a display from among the second plurality of loudspeakers arranged.

12. The apparatus of claim 1, wherein the sound image localization information corresponds to the position of the sound source in a space where the listener is positioned, based on the listener, and an installation of at least one of the first plurality of loudspeakers and the second plurality of loud speakers is changed based on a number of a plurality of loudspeakers, a length of an array of the plurality of loudspeakers, a distance between front and rear loudspeaker arrays of the plurality of loudspeakers, an arranged state of the plurality of loudspeakers, and a size of electronic equipment where the plurality of loudspeakers is arranged.

13. A method of reproducing a wave field, comprising:

determining a position of a sound source by analyzing sound image localization information;

generating a wave field synthesis signal by performing a wave field synthesis rendering for the sound source based on the determined position of the sound source; and reproducing a wave field synthesis signal adjusted based on a sound pressure ratio between at least two front rows of plurality of loudspeakers, selected as being arranged in a vertical direction in front of a listener, to localize a virtual sound source based on the sound pressure ratio, wherein the plurality of loudspeakers include:

a first plurality of loudspeakers to be arranged in at least one back row; and a second plurality of loudspeakers to be arranged in at least two front rows, the at least two front rows of the second plurality of loudspeakers arranged in at least two front rows, the at least two front rows of the second plurality of loudspeakers have directivity directed to a listener.

14. The method of claim 13, wherein the generating comprises:

generating the wave field synthesis signal by performing a wave field synthesis rendering for the sound source when the sound source is determined as a sound source positioned in front of the listener and being elevated; and generating a 3D sound image localization signal by performing the 3D sound image localization rendering on the wave field synthesis signal.

15. The method of claim 13, wherein the plurality of loudspeakers corresponding to one row of the plurality of loudspeakers arranged in the two rows in front of the listener is arranged above the plurality of loudspeakers corresponding to the other row of the plurality of loudspeakers.

16. An apparatus reproducing a wave field, comprising:

a sound source position analysis unit to determine a position of a sound source by analyzing sound image localization information;

a rendering unit to output a wave field synthesis signal by performing a wave field synthesis rendering for the sound source based on the determined position of the sound source;

a first plurality of loudspeakers to be arranged in at least one back row and to reproduce the wave field synthesis signal; and a second plurality of loudspeakers to be arranged in at least two front rows and to reproduce a wave field synthesis signal adjusted based on a sound pressure ratio between the at least two front rows of the second plurality of loudspeakers, selected as being arranged in a vertical direction, to localize a virtual sound source based on the sound pressure ratio, and wherein the at least two front rows of the second plurality of loudspeakers have directivity directed to a listener.

17. The apparatus of claim 16, wherein the second plurality of loudspeakers are respectively arranged, in one row, on an upper portion and a lower portion of a display positioned in front of the listener, and the first plurality of loudspeakers are arranged, in one row, behind the listener.

* * * * *